United States Patent Office 3,322,858
Patented May 30, 1967

3,322,858
MULTICOMPONENT BLENDS CONTAINING GRAFT COPOLYMER OF VINYL CHLORIDE ONTO ETHYLENE-VINYL ACETATE COPOLYMER
Antony William M. Coaker, Wilbraham, and Oscar P. Cohen, Longmeadow, Mass., assignors to Monsanto Company, a corporation of Delaware
No Drawing. Filed Mar. 4, 1964, Ser. No. 349,462
10 Claims. (Cl. 260—876)

The present invention relates generally to a multicomponent blend of thermoplastic polymeric materials and more specifically to a novel multicomponent blend of improved vinyl chloride-ethylene-vinyl acetate graft copolymer plastified with a chlorinated polyolefin and a low-nerve type rubbery copolymer of acrylonitrile and a conjugated diene.

Vinyl chloride polymers elasticated with macromolecular products such as chloroprene, butadiene-acrylonitrile, butadiene-styrene, and chlorinated and chlorosulfonated polyolefins, though found to be useful in applications requiring good impact strength generally acquire impact strength only at the expense of sacrificing one or more of the desirable properties of rigidity, clarity, tensile strength, solvent resistance, high heat distortion point, and chemical resistance. Additionally, mechanical mixtures of polyvinyl chloride and ethylene-vinyl acetate copolymers are incompatible under certain circumstances, tending to produce blends lacking in homogeneity.

No single rigid or semi-rigid polymeric blend enjoys a desirable combination of low cost, ease of fabrication in conventional thermoplastic processing equipment, insolubility, resistance to sunlight and prolonged heat, freedom from fungaceous and bacterial attack, a relatively flat flexural modulus versus temperature curve (giving a wide use-temperature range with rigidity at the desired level), resistance to chemical attack, high impact strength over a wide temperature range, good electrical and thermal insulating and dielectric properties, etc.

Correspondingly, no single flexible thermoplastic blend dominates the field by having an overall desirable combination of properties since one or more of the same general types of deficiencies are found in conventional, natural, and synthetic flexible, and/or leathery thermoplastic materials.

It is therefore an object of this invention to provide improved multicomponent blends of polymeric materials which, together with suitable additives provide superior semi-rigid and flexible thermoplastic compositions for use in exacting service where, to be desirable, a material must combine numerous specific properties.

It is a further object of this invention to provide lower cost compositions which satisfy complex use requirements in service heretofore requiring the specification of only the more expensive semi-rigid or flexible polymeric materials, or those which are particularly difficult to fabricate into useful objects.

It is a still further object of this invention to provide a multicomponent blend of a chlorinated polyolefin, a rubberlike copolymer of acrylonitrile and a conjugated diene, and a graft copolymer prepared by polymerizing a vinyl chloride monomer in the presence of an ethylene vinylacetate or acrylate copolymer.

It is a further object of this invention to provide a process for preparing a multicomponent blend of thermoplastic polymeric materials useful in the production of low cost flexible and semi-rigid products which includes the steps of preparing a graft copolymer of a monomeric material such as vinyl chloride with an ethylene-vinyl acetate copolymer and blending the resultant graft copolymer with a rubberlike copolymer of acrylonitrile and a conjugated diene, together with a chlorinated polyolefin.

It is a further object of this invention to provide the art with a novel composition useful in the production of flexible and semi-rigid compositions for pipes, containers, wire and cable insulation, film and sheeting for electrical and pressure-sensitive tape, dry-cleanable and washable garments, flame resistant insulation facings, etc.

Each of the above objects has been realized through the development of a novel series of graft copolymers composed of pendant vinyl chloride chains polymerized onto a rubbery backbone of an ethylene-vinyl acetate copolymer. The graft copolymers formed in the practice of the present invention, described and claimed in copending U.S. application Ser. No. 158,872, are those wherein 50–99 parts by weight of a vinyl chloride monomer is graft polymerized with 1–50 parts by weight of an ethylene-vinyl acetate copolymer having a vinyl acetate content of between about 15–85 percent by weight. The ethylenically unsaturated monomers useful in preparing the graft copolymer are those consisting of at least 80 percent by weight of vinyl chloride with up to 20 percent of other ethylenically unsaturated monomers copolymerizable therewith, such as vinylidene chloride, vinyl esters of organic acids, acrylonitrile, acrylates, methacrylates, maleates, fumarates, ethylene, propylene, vinyl fluoride, vinyl bromide, divinyl benzene, divinyl phthalate, diallyl maleate, and other unsaturated organic compounds.

The ethylene-vinyl acetate copolymers employed in the practice of the invention consist essentially of 15–85 percent by weight of combined ethylene and 85–15 percent by weight of combined vinyl acetate. These copolymers, which can be prepared by any conventional technique, should have weight average molecular weights of 15,000 to 500,000, and more preferably from about 50,000 to 200,000. For optimum balance of both tensile and impact properties, the preferred graft compositions would be those wherein the ethylene-vinyl acetate copolymer has a vinyl acetate content of between 20 and 35 percent by weight. The graft copolymer material may be prepared by first dissolving, swelling, or dispersing the backbone rubber in finely divided condition in vinyl chloride monomer and then polymerizing the vinyl chloride in mass, solution, suspension, or emulsion using conventional free radical-producing initiators and polymerization aids.

The graft copolymer may be present in amounts ranging between 40 to 90 parts by weight, and preferably between 50 to 60 parts by weight of the multicomponent blend.

The polymerization may be accelerated by heat, irradiation and polymerization catalysts. Catalysts which have been found to be useful are the monomer soluble organic peroxides, e.g., benzoyl peroxide, lauroyl peroxide, 2,4-dichlorobenzoyl peroxide, acetyl benzoyl peroxide, t-butyl peroxypivalate, acetyl cyclohexy sulfonyl peroxide, or other unsymmetrical peroxides, t-butyl hydroperoxide, alkyl percarbonates such as isopropyl peroxy percarbonate, perborates, azo compounds such as azo-isobutyronitrile, and mixtures of the same. The quantity of catalyst will generally be varied depending upon initiator activity, and on the quantity of monomer and diluent, if any. Polymerization aids such as molecular weight modifiers, solvents, suspending agents, particle porosity modifiers, noninhibiting heat stabilizers, emulsifiers, buffers, catalyst activators such as reducing agents, non-interfering plasticizers, fillers, pigments, etc., may also be advantageously employed in this regard.

Any of the other ethylenically unsaturated monomers mentioned previously which are to be copolymerized therewith may be added initially with the vinyl chloride, added later during polymerization or slowly bled into the system during polymerization. Additionally, part of the vinyl chloride may be withheld initially and charged as polymerization progresses. Satisfactory results are obtainable both in batch and continuous operations. The reaction products are isolated by conventional means, the details of which depend upon the particular polymerization technique employed.

The properties of these graft copolymers differ from the properties of a physical blend of polyvinyl chloride with an ethylene-vinyl acetate copolymer, particularly in regard to rigidity, clarity, tensile strength, solvent resistance, heat distortion point, and chemical resistance. One of the primary distinctions between the graft copolymer of this invention and other graft copolymers is that they tend to compatibilize the other useful components in the multi-component blends, i.e., the rubbery copolymer of acrylonitrile and a conjugated diene, and the chlorinated polyolefin.

The second polymeric ingredient in the multicomponent blend which has been found to impart useful properties to the blend is a copolymer prepared by copolymerizing acrylonitrile with a conjugated diene. Particularly useful in this regard are diolefins such as 1,3-butadiene, 2,3-dimethyl-1,3-butadiene, isoprene, cyclopentadiene, 1,3-hexadiene, etc., and substituted diolefins such as chloroprene, 2-chloro-2,3-butadiene, etc. Butadiene is the preferred diene to employ, but other conjugated dienes having up to six carbon atoms may be used with good results. These acrylonitrile copolymers are normally prepared by copolymerizing the monomers in aqueous emulsion, with or without cross-linking agents such as divinylbenzene, for example. The rubberlike copolymer is generally present in the blend in amounts of 5–50 parts by weight and more preferably in amounts of 20–50 parts by weight of the blend. Proportions outside the above ranges are often found to create problems in regard to compatibility of the blends, resulting generally in undesirable variations in physical properties of the resultant blend.

A third polymeric ingredient which has been found to impart desirable and useful properties to the blend is the class of chlorinated and chlorosulfonated polyolefins obtained by chlorinated or chlorosulfonation of high polymeric hydrocarbons such as polyethylene, polypropylene, and their copolymers. These polyolefins may be prepared by any of the methods conveniently used for the chlorination of polyolefins, e.g., by chlorination or chlorosulfonation of the polymer in solution, in aqueous dispersion, or in dry form. The polyolefins are preferably uniformly chlorinated and preferably have number average molecular weights of between about 10,000 to 100,000 and more preferably between about 14,000 and 45,000. The chlorinated polyethylene may also be prepared by copolymerization of ethylene and vinyl chloride.

The chlorine content of the chlorinated polyolefin may vary within wide limits; in fact, polyolefins with chlorine contents as low as 10 percent may be used. On the other hand, chlorine contents above about 49 percent by weight fail to further improve the physical properties of the blend, and tend to cause problems in regard to compatibility. The chlorinated polyolefin may be present in amounts ranging between 5 to 40 parts by weight, and preferably between 10 to 25 parts by weight of the multicomponent blend.

The following examples are given to illustrate the invention and are not intended to be limitations thereof. Unless otherwise indicated, all quantities mentioned are on a part by weight basis.

*Example 1*

A graft polymer is prepared by charging a clean glass lined reaction vessel having an agitator and equipped with heat transfer means to remove the exothermic heat of polymerization, with 160 parts of purified water, 0.35 part of methyl cellulose, and 0.25 part lauroyl peroxide. To this is added a solution of 10 parts of ethylene-vinyl acetate (45:55) in 90 parts vinyl chloride, and the temperature is adjusted to 50° C. After 16 hours, the polymerization is terminated by venting off the residual monomer. 40 parts of the dried resin is then intimately mixed with 50 parts of a butadiene-acrylonitrile copolymer having an acrylonitrile content of 50 percent and 10 parts of chlorinated polyethylene having a chlorine content of 42 percent to produce a homogeneous multicomponent blend.

*Example 2*

Polymerization is carried out as in Example 1, but with solutions of 2 and 50 parts of the same ethylene-vinyl acetate copolymer in 98 and 50 parts by weight of vinyl chloride monomer, respectively, and an additional 10 parts of cyclohexane. In both cases, homogeneous resins of fine particle size are obtained. 90 parts of the resultant resin are blended with 5 parts of a chloroprene-acrylonitrile copolymer having 20 percent acrylonitrile and 5 parts of chlorinated polyethylene having a chlorine content of 23 percent to produce a homogeneous blend.

*Example 3*

Polymerization is carried out as in Example 2 except that 80 parts by weight of vinyl chloride and 20 parts by weight of vinyl acetate are used in place of vinyl chloride. A homogeneous granular resin is obtained. 50 parts of the resin are blended with 10 parts of an isoprene-acrylonitrile copolymer having 40 percent acrylonitrile and 40 parts of chlorinated polypropylene having a chlorine content of about 30 percent to produce a multicomponent blend.

*Example 4*

A solution of 25 parts ethylene-vinyl acetate copolymer (15% vinyl acetate) in 10 parts of cyclohexane and 75 parts vinyl chloride monomer is dispersed under agitation in an air-evacuated pressure vessel in 160 parts water containing 0.36 part methyl cellulose as suspending agent and 0.26 part lauroyl peroxide as polymerization initiator. After 16 hours polymerization at 50° C., a homogeneous granular resin having a specific viscosity of 0.46 is obtained. 60 parts of the resin is blended with 35 parts of a cyclopentadiene-acrylonitrile copolymer containing 30 percent acrylonitrile and 25 parts of chlorinated polyethylene (10% chlorine) to produce a homogeneous blend.

*Example 5*

Polymerization is carried out as in Example 4, but with solutions of 40 parts of ethylene-vinyl acetate copolymer (27% vinylacetate) in 60 parts by weight of vinyl chloride monomer. Homogeneous resins of fine particle size are obtained. 80 parts of the resultant resin are blended with 15 parts of chlorinated polyethylene having a chlorine content of 37 percent and 5 parts of a butadiene acrylonitrile copolymer having an acrylonitrile content of 60 percent to produce a homogeneous blend.

*Example 6*

Polymerization is carried out as in Example 4, but with solutions of 10 parts ethylene-vinyl acetate (85 percent vinyl acetate) copolymer in 90 parts by weight of vinyl chloride monomer. 50 parts of the resultant homogeneous resin are blended with 10 parts of chlorinated polyethylene having a chlorine content of 32 percent and 40 parts of a butadiene acrylonitrile copolymer having an acrylonitrile content of 40 percent to produce a homogeneous multicomponent blend.

The compositions described in this invention have a relatively broad range of use temperatures and combine exceptional resistance to chemical attack, low moisture absorption, freedom from fungaceous and bacterial attack, absence of fugitive or migrating constituents, resistance to the deleterious effects of prolonged exposure to heat and light, high mutual compatibility of constituents, thus minimizing the defects known as "spew" and "bloom," and low flammability. Hardness, rigidity dimensional stability, creep resistance, toughness, tensile strength, elongation and tear strength may readily be adjusted over the range associated with semi-rigid and flexible thermoplastics by varying the proportions of the polymeric constituents and liquid plasticizers, if any.

Processing temperatures for the compositions herein described are such that no significant degradation occurs during the overall manufacturing operation.

Typical applications for the flexible materials include wire and cable insulation, non-migratory jacketing for polyethylene primary insulation, fungus resistant underground feeder cable jacketing, film and sheeting for electrical and pressure-sensitive tape, dry-cleanable and washable garments, draperies and upholstery, non-fogging automobile crash pads and upholstery, and pipe-wrap tapes.

Processing aids which may advantageously be incorporated include acrylate rubbers, styrene-acrylonitrile-butadiene terpolymers, styrene-methyl styrene acrylonitrile terpolymers, styrene-acrylonitrile copolymers, methyl methacrylate polymers, solid aromatic residues from petroleum cracking operations, and so forth.

Liquid plasticizers which are useful in certain of the compositions include phosphate esters such as tricresyl phosphate, tri(2-ethyl hexyl) phosphate, phthalate esters such as di-2-ethyl hexyl and di-tridecyl phthalate, tetrahydro-hexahydrophthalate esters, adipate esters such as di-n-octyl and n-octyl-n-decyl adipate, azelate esters such as di-2-ethyl hexyl azelate, sebacate esters such as di-2-ethyl hexyl sebacate, trimellitate esters, epoxidized soybean oil, epoxidized tall oil, di-epoxidized linseed oil and epoxy stearate plasticizers, complex linear polyesters and polymeric plasticizers, certain citric, acetylcitric, tartaric and ricinoleic acid esters, certain glycol, glycerol and penta-erythritol esters of fatty acids, and so forth.

Other additives may be used for optimizing the processing performance and/or end use properties of the compositions such as stabilizers, co-stabilizers, antioxidants, lubricants, coated and/or uncoated fillers, pigments and light screeners.

The particular combination of primary ingredients and additives in commercially useful compositions within the range of this invention depends on the specific combination of end use requirements and is varied from one application to another to achieve the optimum overall cost-performance ratio.

While in the foregoing specification specific compositions and steps have been set out in considerable detail for the purpose of illustrating the invention, it will be understood that such details of composition and procedure may be varied widely by those skilled in the art without departing from the spirit of this invention.

What is claimed is:

1. A composition of matter comprising (1) 40–90 parts by weight of a graft blend prepared by polymerizing 59–99 parts by weight of a monomeric material containing 1–50 parts by weight of an ethylene-vinyl acetate copolymer; said monomeric material comprising 80–100 percent by weight of vinyl chloride and 20–0% by weight of other ethylenically unsaturated monomers copolymerizable therewith, (2) 5–50 parts by weight of a rubberlike copolymer of acrylonitrile and a conjugated diene having an acrylonitrile content of between about 20–50 percent by weight of the copolymer and (3) 5–40 parts by weight of a chlorinated polymer of an alpha-monoolefin of about 2 to 3 carbon atoms..

2. A composition according to claim 1 wherein the ethylene-vinyl acetate copolymer has a vinyl acetate content of between about 15–85 percent by weight.

3. A composition according to claim 1 wherein said chlorinated polyolefin present in amounts of 5–40 parts by weight has a chlorine content of 10–49 percent by weight.

4. A composition according to claim 1 wherein the rubberlike copolymer is a butadiene-acrylonitrile copolymer.

5. A composition according to claim 1 wherein said chlorinated polymer of an alpha-monoolefin of about 2 to 3 carbon atoms present in amounts of 5–40 parts by weight is chlorinated polyethylene.

6. A composition according to claim 5 wherein said ethylene-vinyl acetate copolymer used in the preparation of the graft blend has a weight average molecular weight of 15,000 to 500,000.

7. A composition according to claim 1 wherein said graft blend is present in amounts of 50–60 parts by weight, said rubberlike copolymer of a conjugated diene and acrylonitrile is present in amounts of 20–50 parts by weight, and said chlorinated polymer of an alpha-monoolefin of about 2 to 3 carbon atoms is present in amounts of 10–25 parts by weight.

8. A process for preparing a multicomponent blend of a thermoplastic polymeric material useful in the production of low-cost flexible and semi-rigid products comprising the steps of (1) preparing a graft blend by polymerizing 50–99 parts by weight of a monomeric material with 1–50 parts by weight of an ethylene-vinyl acetate copolymer; said monomeric material comprising 80–100% by weight of vinyl chloride and 20–0% by weight of other ethylenically unsaturated monomers copolymerizable therewith; (2) and blending therewith 5 to 50 parts by weight of a rubberlike copolymer of acrylonitrile and a conjugated diene having an acrylonitrile content of between about 20–50 percent by weight of the copolymer together with 5–40 parts by weight of a chlorinated polymer of an alpha-monoolefin of about 2 to 3 carbon atoms.

9. A process according to claim 8 wherein the rubberlike copolymer is a butadiene-acrylonitrile copolymer.

10. A composition according to claim 1 wherein the chlorinated polymer is present in amounts of about 10–25 parts by weight.

References Cited

UNITED STATES PATENTS 3,085,082  4/1963  Baer et al. _____ 260—876

FOREIGN PATENTS 626,534  8/1961  Canada.

MURRAY TILLMAN, *Primary Examiner.*

SAMUEL H. BLECH, G. F. LESMES,
*Assistant Examiners.*

UNITED STATES PATENT OFFICE
CERTIFICATE OF CORRECTION

Patent No. 3,322,858                                May 30, 1967

Antony William M. Coaker et al.

It is certified that error appears in the above identified patent and that said Letters Patent are hereby corrected as shown below:

Column 5, line 57, for "59-" read -- 50- --.

Signed and sealed this 22nd day of July 1969.

(SEAL)
Attest:

Edward M. Fletcher, Jr.                    WILLIAM E. SCHUYLER, JR.
Attesting Officer                            Commissioner of Patents